[11] 3,564,244

| [72] | Inventors | Raymond Schayes<br>Brussel;<br>Lucien Kersten, Dilbeek; Claude Brooke,<br>Ukkel, Belgium |
|---|---|---|
| [21] | Appl. No. | 579,129 |
| [22] | Filed | Sept. 13, 1966 |
| [45] | Patented | Feb. 16, 1971 |
| [73] | Assignee | Manufacture Belge De Lampes et De<br>Material Electronique en Abrege M.B.L.E.<br>Brussel, Belgium |
| [32] | Priority | Sept. 16, 1965 |
| [33] | | Belgium |
| [31] | | 17,982 |

[54] MEASURING DEVICE FOR THERMOLUMINESCENT DOSIMETRY INCLUDING A DIFFUSELY REFLECTING BODY
2 Claims, 4 Drawing Figs.

[52] U.S. Cl. .................................................. 250/71,
250/227; 350/96
[51] Int. Cl. .................................................. G01t 1/11
[50] Field of Search ......................................... 250/71,
71.5, 227; 350/96; 88/14SH

[56] References Cited
UNITED STATES PATENTS

| 2,727,154 | 12/1955 | Goldsworthy | 250/71.5 |
| 3,088,037 | 4/1963 | Baum | 250/227 |
| 3,239,665 | 3/1966 | Blase et al. | 250/71.5 |
| 3,300,643 | 1/1967 | McCall | 250/71 |
| 2,507,909 | 5/1950 | Kaysen | 350/96X |
| 3,114,283 | 12/1963 | Gruner | 350/96X |
| 3,220,871 | 11/1965 | Lemelson | 350/96UX |
| 3,265,892 | 8/1966 | Sheldon | 350/96X |

Primary Examiner—Archie R. Borchelt
Attorney—Frank R. Trifari

ABSTRACT: A device for measuring the light emitted by a thermoluminescent element when heated including a body of material transparent to light which, except for a wall portion for the observation of emitted light when the thermoluminescent element is heated, has an exterior light-reflecting surface.

PATENTED FEB 16 1971  3,564,244
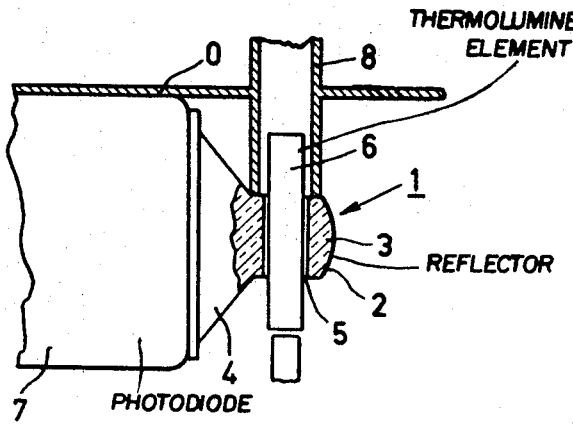
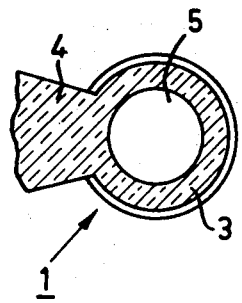
FIG.1  FIG.2
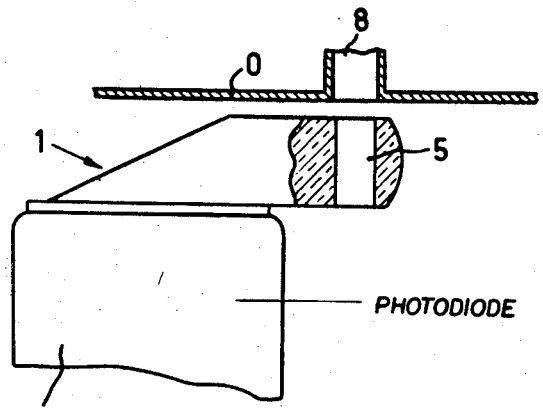
FIG.3
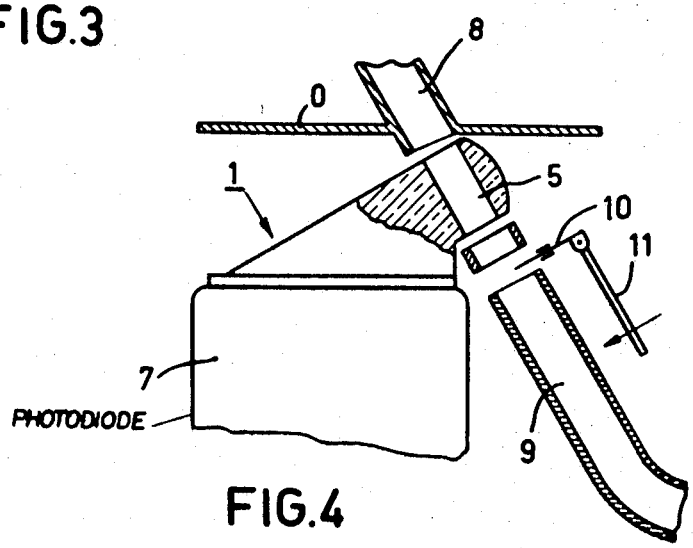
FIG.4
INVENTORS
RAYMOND SCHAYES
LUCIEN KERSTEN
BY CLAUDE BROOKE
Frank R. Trifari
AGENT

MEASURING DEVICE FOR THERMOLUMINESCENT DOSIMETRY INCLUDING A DIFFUSELY REFLECTING BODY

The invention relates to a measuring device for measuring a quantity of light emitted by a thermoluminescent dosimeter arranged in the device.

It is known that given substances such as calcium fluoride, when struck by ionizing or nuclear radiations, emit the received energy in the form of light upon heating. The property of these substances is referred to as thermoluminescence, and thermoluminescent dosimeters for measuring the received dose of energy of ionizing radiations include a radiation-sensitive element consisting of such a thermoluminescent substance. After irradiation, the dosimeter is introduced into a measuring device and the radiation-sensitive element is heated, while the quantity of emitted light is collected by a light-sensitive element, for example, a photodiode or a photomultiplier, which provides an electrical indication corresponding to the emitted light.

The light emitted by the dosimeter must be collected to the highest possible extent and be passed to the light-sensitive element. This was achieved hitherto with the aid of a set of mirrors. However, these mirrors do not collect the whole quantity of light. Consequently, the sensitivity of the device is not to the optimum and this is disadvantageous especially if photodiodes are used which supply very weak current signals. Moreover, it is required that the deviations due to the anisotropy of the emitted light should be neutralized. Two identical bodies which have received the same dose of ionizing energy but at different angles of incidence, emit the same quantity of light, it is true, but its distribution at the angle of emission is different. As a result, the optimum accuracy of the device is not attained either.

A measuring device is known which is provided with a space for receiving a thermoluminescent dosimeter, which space is closed from penetrating light and communicates with the light-sensitive element, the light emitted by the dosimeter being passed directly and by reflection to the greatest possible extent towards the said element. It is very difficult to prevent the intensity of the light supplied to the light-sensitive element on a roundabout way from being reduced if in due course the reflecting properties of the surrounding wall are varied or if contamination cannot be sufficiently avoided in case reflective layers are used. It has been found that in this case the measuring results are not only influenced by the decrease of the measuring sensitivity of the device to weak radiation of light, but also by the arrangement of the dosimeter in the device, since the radiation collected by the dosimeter is not always distributed uniformly throughout the surface of the radiation-sensitive element.

The invention has for its object to avoid these disadvantages. According to the invention, the device includes a body of a material transparent to light which surrounds the dosimeter and which, except a wall portion for the observation of the emitted light, has on its outer side a light-reflecting surface.

Phenomena that may influence the measuring result and that are due to the anisotropy of the light emitted by the dosimeter may be avoided in that the body of a material transparent to light is coated with a layer diffusely reflecting to the interior. The measured light output resulting from the irradiation of the radiation-sensitive element thus becomes less dependent upon a nonuniform distribution of the radiation absorption in the radiation-sensitive element.

In order that the invention may be readily carried into effect, it will now be described more fully with reference to the accompanying drawing, in which:

FIG. 1 shows a part of the measuring device in which the light-sensitive element is horizontally arranged and the dosimeter is introduced into the device in vertical position;

FIG. 2 is a flat horizontal sectional view of the body,

FIG. 3 shows a part of the measuring device in which the light-sensitive element is vertically arranged and the dosimeter is introduced into the device in vertical position; and FIG. 4 shows a part of the measuring device in which the light-sensitive element is vertically arranged and the dosimeter is introduced obliquely into the device.

In the FIGS. identical parts are designated by the same reference numerals.

The dosimeter 6 of FIG. 1 has a cylindrical envelope in which a cylindrical support for a radiation-sensitive element is incorporated, the two cylinders being arranged coaxially. The elongated cylindrical thermoluminescent element has the advantage that the sensitive layer receives a dose of radiation which is approximately a measure to the real dose received by the person who has carried along this dosimeter. The angle of incidence of the ionizing radiation of a vertically supported dosimeter is invariably approximately the same for each surface element. The dosimeter 6 is arranged in a perforation of the body 1 consisting of a transparent material such as glass or of a synthetic substance, for example, plexiglass. The outer surface is coated with a diffusely reflecting layer 2. The general shape of the body 1 is that of a ring 3 having a spherical outer surface a part of which joins by a widened portion 4 the part of the wall on which the light-sensitive element 7, for example a photodiode or a photomultiplier, is arranged. It should be noted that the aperture 5 in the body 1 extends from the upper side throughout the body so that the dosimeter 6 can be readily introduced into and removed from the body 1. A sectional view taken on a plane normal to the axis of revolution is shown in FIG. 2. FIGS. 3 and 4 are sectional views taken on a plane containing this axis of slightly different embodiments.

The dosimeter 6 with the cylindrical envelope is introduced into the device through a tubular duct 8 which is in line with the aperture 5 in the body 1. The dosimeter 6 is arranged in this duct so that the part of the dosimeter which emits light is located in the aperture in the body 1 so that the whole quantity of emitted light is passed to the photoelement 7 due to the reflective surface 2.

The shape of the body 1 of a material transparent to light shown in FIG. 3 permits the vertical arrangement of this light-sensitive cell 7.

In the embodiment of FIG. 4, the dosimeter is likewise introduced into the device through a tubular duct 8 but this dosimeter is removed from the device through a second duct 9 on the lower side along which the dosimeter can slide under the influence of the gravitation. Both ducts are in line with the aperture 5 in the body 1. In this case, a dosimeter can be replaced more rapidly. The bolt 10 locking or unlocking the aperture 9 can be displaced with the aid of a handle 11.

If the transparent body 1 is manufactured from glass, the advantage is obtained that a kind of glass may be used which has the same index of refraction for the emitted light as the window through which the light reaches the photodiode or photomultiplier, which prevents undesired light reflections from being produced at the transitional area between the two surfaces, which reflections are detrimental to the measurement of low light intensities.

We claim:

1. In a device for measuring the light emitted by a thermoluminescent element when heated, the improvement comprising a body of a material transparent to light surrounding the thermoluminescent element, said body having a light-reflecting surface covering the exterior surface of said body except for a portion thereof through which the light is transmitted to a light-responsive device.

2. A measuring device as claimed in claim 1, characterized in that the light-reflecting surface of the body made of a material transparent to light is coated with a diffusely reflecting layer.